United States Patent
Thompson

(10) Patent No.: US 6,772,302 B1
(45) Date of Patent: Aug. 3, 2004

(54) VIRTUAL COPY METHOD FOR DATA SPANNING STORAGE BOUNDARIES

(75) Inventor: John Glenn Thompson, Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/439,899

(22) Filed: Nov. 12, 1999

(51) Int. Cl.[7] .............................................. G06F 12/00
(52) U.S. Cl. ........................ 711/162; 711/161; 707/204; 714/6
(58) Field of Search ................................. 711/162, 1, 4, 711/114, 161; 707/205, 204; 714/6

(56) References Cited

U.S. PATENT DOCUMENTS

| | | | |
|---|---|---|---|
| 5,410,667 A | * 4/1995 | Belsan et al. ................ | 711/114 |
| 5,435,004 A | * 7/1995 | Cox et al. .................... | 707/205 |
| 5,446,855 A | * 8/1995 | Dang et al. ..................... | 711/1 |
| 5,623,669 A | * 4/1997 | Kincaid ........................ | 707/205 |
| 5,678,061 A | 10/1997 | Mourad ....................... | 395/841 |
| 5,815,649 A | 9/1998 | Utter et al. ............ | 395/112.04 |
| 5,897,661 A | 4/1999 | Baranovsky et al. ........ | 711/170 |
| 6,192,444 B1 | * 2/2001 | White et al. .................... | 711/4 |
| 6,216,211 B1 | * 4/2001 | McBrearty et al. ......... | 711/162 |

OTHER PUBLICATIONS

IBM Technical Disclosure Bulletin, "Scheme for Low–Overhead High–Concurrency Update," vol. 39, No. 11, pp. 139–144, Nov. 1996.

IBM Technical Disclosure Bulletin, "The Clonetree Tool," vol. 39, No. 11, pp., 119–121, Nov. 1996.

* cited by examiner

Primary Examiner—Do Hyun Yoo
Assistant Examiner—Nasser Moazzami
(74) Attorney, Agent, or Firm—Dan Hubert & Assoc.

(57) ABSTRACT

Instant virtual copy operations are adapted for data objects that span storage boundaries such as logical and/or physical DASD subsystems. Initially, a data storage system receives a request to copy a data object contained in the system. The storage system includes multiple storage regions separated by storage boundaries. The regions may correspond to logical or physical DASD subsystems, for example. The storage system determines whether the data object resides in more than one of these regions. If so, the storage system divides the data object into multiple subparts, each subpart contained within a single storage region. Then, the storage system separately performs an instant virtual copy operation for each subpart. On the other hand, if the data object already resides in a single one of the regions, the storage system can perform one instant virtual copy operation for the data object as a whole.

20 Claims, 3 Drawing Sheets

VIRTUAL COPY METHOD FOR DATA SPANNING STORAGE BOUNDARIES

BACKGROUND OF THE INVENTION

1. Field of the Invention

The present invention relates to copy operations performed upon data that resides in direct access storage device ("DASD"). More particularly, the invention concerns a method of adapting instant virtual copy methods to data objects that span storage boundaries such as logical and/or physical DASD subsystems.

2. Description of the Related Art

A number of DASD subsystems are capable of performing "instant virtual copy" operations, also referred to as "fast replicate functions." Instant virtual copy operations operate by modifying metadata such as relationship tables or pointers to treat a source data object as both the original and copy. In response to a host's copy request, the storage subsystem reports creation of the copy without having made any physical copy of the data. Only a "virtual" copy has been created, and the absence of any physical copy is completely unknown to the host.

Later, when the storage system receives updates to the original or copy, the updates are stored separately and cross-referenced to the updated data object only. At this point, the original and copy data objects begin to diverge. The initial benefit is that the virtual copy occurs almost instantaneously, and at any rate, much faster than a normal, physical copy operation. This frees the host and storage subsystem to perform other tasks. The host or storage subsystem may even proceed to create an actual, physical copy of the original data object during background processing, or at another time.

With such benefits, instant virtual copy has been an important development in modern DASD subsystems, and a number of different embodiments have surfaced. As one example, International Business Machines Corporation ("IBM") has developed the "flash copy" technique, as described in U.S. application Ser. No. 09/347,344, filed on Jul. 2, 1999 and entitled "Method, System, and Program for Maintaining Electronic Data as of a Point-In-Time." Another example is the "snapshot" technique disclosed in U.S. Pat. No. 5,410,667 entitled "Data Record Copy System for a Disk Drive Array Data Storage Subsystem," which issued on Apr. 25, 1995. The foregoing references are hereby incorporated herein by reference.

Although these techniques are useful in many applications, there are still certain limitations. Namely, known instant virtual copy techniques do not apply to data objects that span storage boundaries such as logical or physical DASD subsystems. For example, if a data object occupies storage that has been allocated to different log structured arrays, the snapshot technique cannot be used to create an instant virtual copy of the data object.

This problem is especially acute in today's data storage subsystems, where data objects frequently span storage boundaries for a number of different reasons. For one, multi volume datasets often span storage boundaries because of their large size. As another example, data objects sometimes end up spanning storage boundaries because of "system managed storage," where the storage system rather than the host selects the optimum storage strategy to meet requirements of access time, data redundancy, etc. As still another reason, data objects necessarily span storage boundaries to implement "striping" or other data distribution schemes designed to minimize the effect of a catastrophic failure of one storage component.

Therefore, modern data storage subsystems frequently present situations where data objects span storage boundaries. However, as described above, known instant virtual copy techniques are not available in these situations. Without the instant virtual copy technique, copy requests are performed by the host, which reads source data from storage into host memory and then rewrites the data to target storage. Undesirably, this process demands more time than the instant virtual copy process, and also consumes valuable host processing resources. These demands are likely to be high because the data objects that span storage boundaries are likely to be large, due to the fact that they occupy enough space to span storage boundaries. In these situations, then, known instant virtual copy techniques may not be completely adequate due to certain unsolved problems.

SUMMARY OF THE INVENTION

Broadly, the present invention concerns the adaptation of instant virtual copy techniques to data objects that span storage boundaries such as logical and/or physical DASD subsystems. Initially, a data storage system receives a request to copy a data object contained in the system. The storage system includes multiple storage regions separated by storage boundaries. The regions may correspond to logical or physical DASD subsystems, for example. The storage system determines whether the data object resides in more than one of these regions. If so, the storage system divides the data object into multiple subparts, each contained within a single storage region. Then, the storage system separately performs an instant virtual copy operation for each subpart. On the other hand, if the data object already resides in a single one of the regions, the storage system can perform an instant virtual copy operation for the entire data object as a whole.

Accordingly, one embodiment of the invention constitutes a method to make instant virtual copies of data objects that span storage boundaries. In another embodiment, the invention may be implemented to provide an apparatus, such as a data storage system, configured to make instant virtual copies of data objects despite their spanning of storage boundaries. In still another embodiment, the invention may be implemented to provide a signal-bearing medium tangibly embodying a program of machine-readable instructions executable by a digital data processing apparatus to perform copy operations as discussed above. Another embodiment concerns logic circuitry having multiple interconnected electrically conductive elements configured to perform copy operations as discussed above.

The invention affords its users with a number of distinct advantages. Chiefly, the invention enables a storage system to copy a data object virtually immediately, regardless of how that data object is distributed in the storage system. Accordingly, the invention conserves host processing capability, since copy operations are completed quickly. Thus, processing resources are more available for other tasks, such as satisfying read/write requests, mirroring data to remote storage sites, running application programs, etc. The invention also provides a number of other advantages and benefits, which should be apparent from the following description of the invention.

DETAILED DESCRIPTION

The nature, objectives, and advantages of the invention will become more apparent to those skilled in the art after considering the following detailed description in connection with the accompanying drawings.

HARDWARE COMPONENTS & INTERCONNECTIONS

Overall System Description

Figure 1:
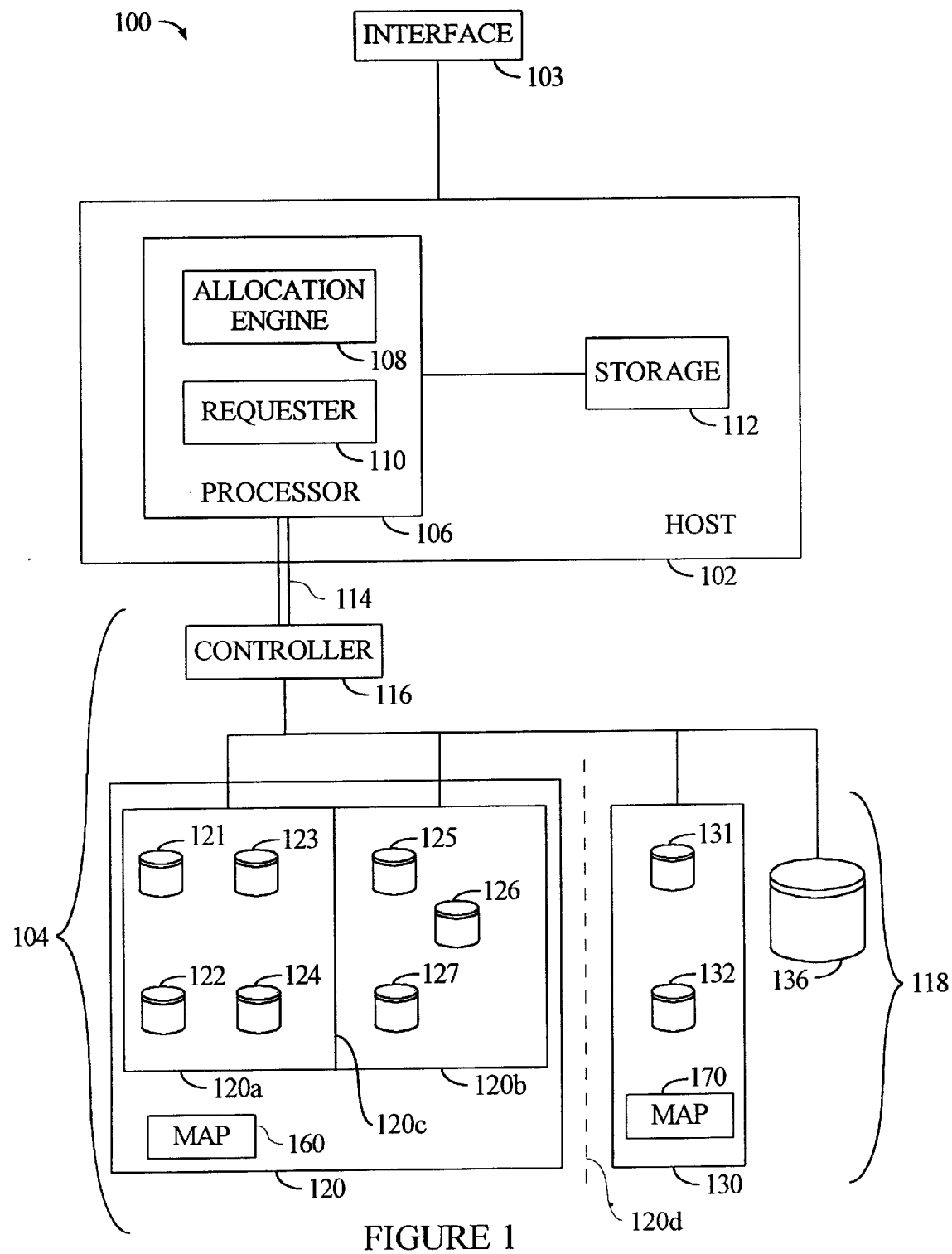
FIG. 1 is a block diagram of the hardware components and interconnections of a data storage system, according to the invention.

One aspect of the invention concerns a data storage system, which may be embodied by various hardware components and interconnections. FIG. 1 shows a data storage system 100, as one particular example. Broadly, the storage system 100 includes an interface 103, a host 102, and a data storage facility 104. The host 102 employs the interface 103 to communicate with a human operator or another computer. In the case of a human operator, the interface 103 may be implemented by a control panel, video monitor, keyboard, speaker/microphone, or another suitable item or combination thereof. In the case of another computer, the interface 103 may comprise one or more busses, wires, backplanes, optical fibers, wireless links modems, intelligent communication channels, etc. The host 102 includes a processor 106 coupled to storage 112, which contains volatile and/or nonvolatile storage components appropriate to the applications discussed herein. The processor 106 includes a number of software modules, including an allocation engine 108 and a requester 110. As explained in greater detail below, the processor 106 may comprise an instruction-processing computer, integrated logic circuit, assembly of discrete circuit elements, etc. As an example, the host 102 may be implemented using an IBM model RS/6000 machine.

The data storage facility 104 includes a controller 116 and various storage components 118. The controller 116 communicates with the host 102 using an input/output ("I/O") link 114, such as one or more intelligent communications channels, wires, busses, wireless links, fiber optic couplings, etc. The controller 116 may comprise an instruction-processing computer, integrated logic circuit, assembly of discrete circuit elements, etc. The storage components 118 include various DASD components, which may be implemented in magnetic hard disk drives, RAID, log structured arrays, or any other DASD form. To provide several examples that are useful in explaining the instant virtual copy technique of this invention, the illustrated storage components 118 include a first and second physical DASD subsystems 120, 130. The first DASD subsystem 120 is logically partitioned into first and second logical DASD subsystems 120a, 120b, separated by a logical storage boundary 120c. In contrast with the logical storage boundary 120c, a physical boundary 120d separates the first and second DASD subsystems 120, 130. Some exemplary DASD subsystems include the IBM model 2105, RAMAC-3, and RAMAC Virtual Array (RVA) products.

The data storage facility 104 also includes a catalog 136, which implements one of many possible approaches to organizing stored data. The catalog 136 is used by the host 102 in its data management role. Each DASD subsystem 120, 130 includes a number of logical devices, such as devices 121–127 in the DASD subsystem 120, and devices 131–132 in the DASD subsystem 130. The logical devices may also be referred to as "volumes." The illustrated logical devices represent imaginary DASD devices. Physically, however, the subsystems may be advantageously implemented using hundreds or thousands of small disk drives, where several of these disk drives cooperatively make up one logical device. The catalog 126 lists the data objects contained on each logical device, as exemplified by TABLE 1 (below).

TABLE 1

CATALOG

| LOGICAL DEVICE ("VOLUME") | DATA OBJECTS |
|---|---|
| 121 | DATA OBJECT-1, DATA OBJECT-2, DATA OBJECT-3 |
| 122 | DATA OBJECT-4 |
| 123 | DATA OBJECT-6 (part 3) |
| 124 | DATA OBJECT-6 (part 1) |
| 125 | DATA OBJECT-6 (part 2), DATA OBJECT-7, DATA OBJECT-8 |
| 126 | DATA OBJECT-9 |
| 127 | DATA OBJECT-10 |
| 131 | DATA OBJECT-10 |
| 132 | DATA OBJECT-11 |

TABLE 2 shows an alternative to TABLE 1, with the same data from TABLE 1 being organized according to data object rather than logical device.

TABLE 2

ALTERNATIVE CATALOG

| DATA OBJECT | LOGICAL DEVICE(S) |
|---|---|
| DATA OBJECT-1 | 121 |
| DATA OBJECT-2 | 121 |
| DATA OBJECT-3 | 121 |
| DATA OBJECT-4 | 122 |
| DATA OBJECT-6 | 124, 125, 123 |
| DATA OBJECT-7 | 125 |
| DATA OBJECT-8 | 125 |
| DATA OBJECT-9 | 126 |
| DATA OBJECT-10 | 127, 131 |
| DATA OBJECT-11 | 132 |

In addition to the catalog 136, further detail of the data objects' locations is stored upon the logical devices themselves. Namely, each logical device includes a local directory that lists the address range ("extent") of each data object contained in that logical drive. Since the logical devices themselves are virtual constructs, for the benefit of the host 102, these address ranges are also logical designators, with their significance being relative to the logical devices (utilized by the host 102) rather than any physical device addresses (utilized by the controller 116). The local directories may comprise volume table of contents ("VTOCs"), as one example. TABLE 3 shows an exemplary local directory for the logical device 121, with this directory being configured as a VTOC.

TABLE 3

LOCAL DIRECTORY (VTOC) FOR LOGICAL DEVICE (VOLUME) 121

| DATA OBJECT | LOGICAL ADDRESS RANGE |
|---|---|
| DATA OBJECT-1 | 0113–2383 |
| DATA OBJECT-2 | 3339–6320 |
| DATA OBJECT-3 | 7239–7309 |

In addition to the catalog 136 and local directories, the data storage facility includes other metadata that is available to the controller 116 for certain data management tasks that are invisible to the host 102. Namely, each physical DASD subsystem 120, 130 contains a respective subsystem map 160, 170. The subsystems maps contain lower level information that is invisible to the host 102. As an example, the maps 160, 170 may designate the extent of any partitions or other logical subsystems (e.g., 120a, 120b), specify mapping between logical devices and their underlying physical storage disks (not shown), etc.

Exemplary Digital Data Processing Apparatus

Figure 2:
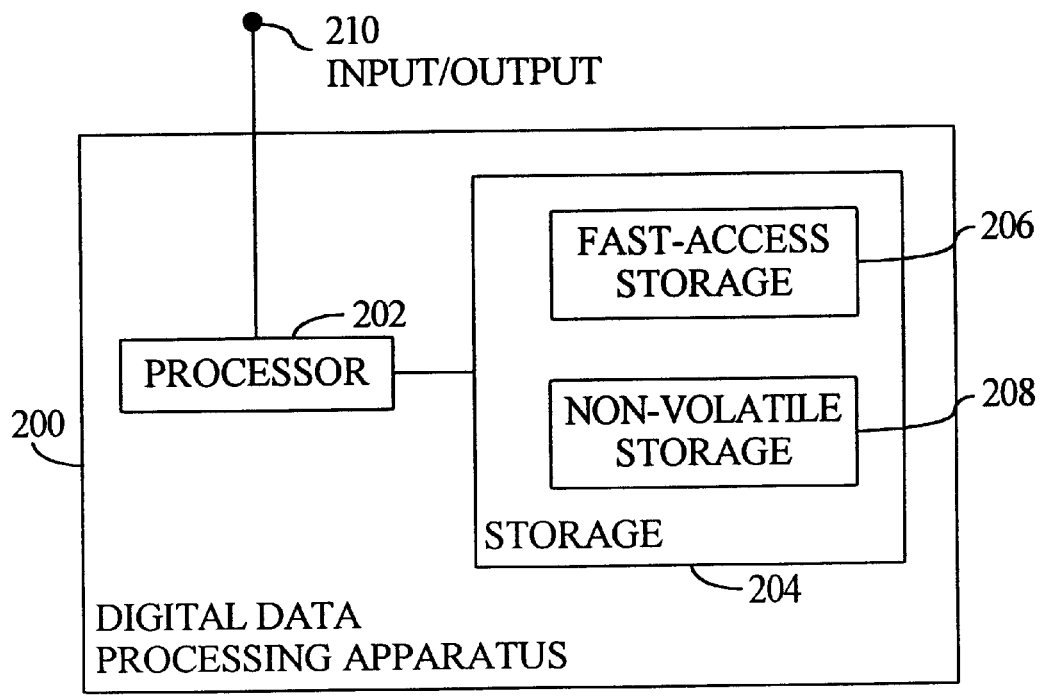
FIG. 2 is a block diagram of a digital data processing machine according to the invention.

Another aspect of the invention concerns a digital data processing apparatus, which may be used to implement the controller 116, host 102, or other processing components in the system 100. This apparatus may be embodied by various hardware components and interconnections; one example is the digital data processing apparatus 200 of FIG. 2. The apparatus 200 includes a processor 202, such as a microprocessor or other processing machine, coupled to a storage 204. In the present example, the storage 204 includes a fast-access storage 206, as well as nonvolatile storage 208. The fast-access storage 206 may comprise random access memory (RAM), and may be used to store the programming instructions executed by the processor 202. The nonvolatile storage 208 may comprise, for example, one or more magnetic data storage disks such as a "hard drive," a tape drive, or any other suitable storage device. The apparatus 200 also includes an I/O link 210, such as a line, bus, cable, electromagnetic link, or other means for the processor 202 to exchange data with other hardware external to the apparatus 200.

Despite the specific foregoing description, ordinarily skilled artisans (having the benefit of this disclosure) will recognize that the apparatus discussed above may be implemented in a machine of different construction, without departing from the scope of the invention. As a specific example, one of the components 206, 208 may be eliminated; furthermore, the storage 204 may be provided on-board the processor 202, or even provided externally to the apparatus 200.

Logic Circuitry

In contrast to the digital data storage apparatus discussed previously, a different embodiment of the invention uses logic circuitry instead of computer-executed instructions to implement the host 102 and/or controller 116. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS, TTL, VLSI, or another suitable construction. Other alternatives include a digital signal processing chip (DSP), discrete circuitry (such as resistors, capacitors, diodes, inductors, and transistors), field programmable gate array (FPGA), programmable logic array (PLA), and the like.

OPERATION

In addition to the various hardware embodiments described above, a different aspect of the invention concerns a method for performing instant virtual copy operations upon data objects that span storage boundaries such as logical and/or physical DASD subsystems.

Signal-Bearing Media

In the context of FIG. 1, such a method may be implemented, for example, by operating the controller 116 and host 102, as embodied by separate digital data processing apparatuses 200, to execute respective sequences of machine-readable instructions. These instructions may reside in various types of signal-bearing media. In this respect, one aspect of the present invention concerns one or more programmed products, comprising signal-bearing media tangibly embodying a program of machine-readable instructions executable by a digital data processor to perform an instant virtual copy operation upon a data object that spans storage boundaries, such as logical and/or physical devices.

Figure 3:
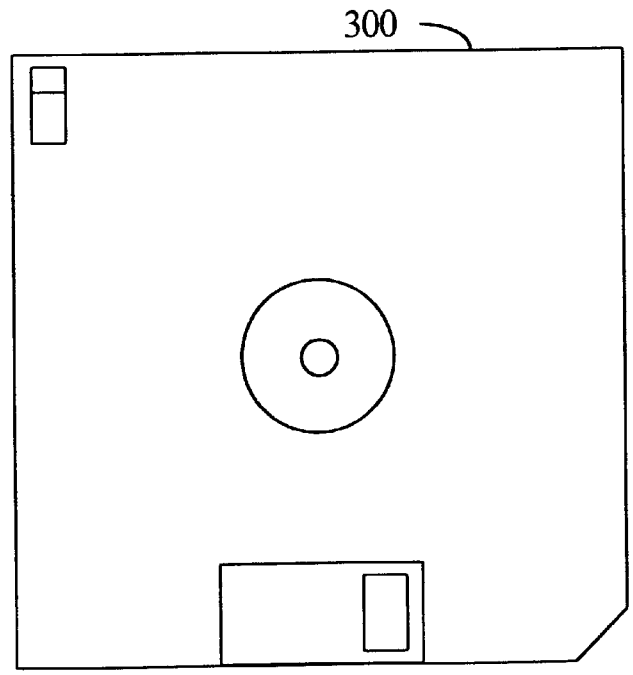
FIG. 3 shows an exemplary signal-bearing medium according to the invention.

This signal-bearing media may comprise, for example, RAM (not shown) contained within the controller 116 or host 102 as applicable, and represented by the fast-access storage 206. Alternatively, the instructions may be contained in another signal-bearing media, such as a magnetic data storage diskette 300 (FIG. 3), directly or indirectly accessible by the processor 200. Whether contained in the storage 206, diskette 300, or elsewhere, the instructions may be stored on a variety of machine-readable data storage media, such as direct access storage (e.g., a conventional "hard drive," redundant array of inexpensive disks (RAID), or another DASD), magnetic tape, electronic read-only memory (e.g., ROM, EPROM or EEPROM), optical storage (e.g., CD-ROM, WORM, DVD, digital optical tape), paper "punch" cards, or other suitable signal-bearing media including transmission media such as digital and analog and communication links and wireless. In an illustrative embodiment of the invention, the machine-readable instructions may comprise software object code, compiled from a language such as "C," etc.

Logic Circuitry

In contrast to the signal-bearing medium discussed above, the method aspect of the invention may be implemented using logic circuitry, without using a processor to execute instructions. In this embodiment, the logic circuitry is implemented in the controller 116 or host 102 as applicable, and is configured to perform operations to implement the method of the invention. The logic circuitry may be implemented using many different types of circuitry, as discussed above.

Overall Sequence of Operation

Figure 4:
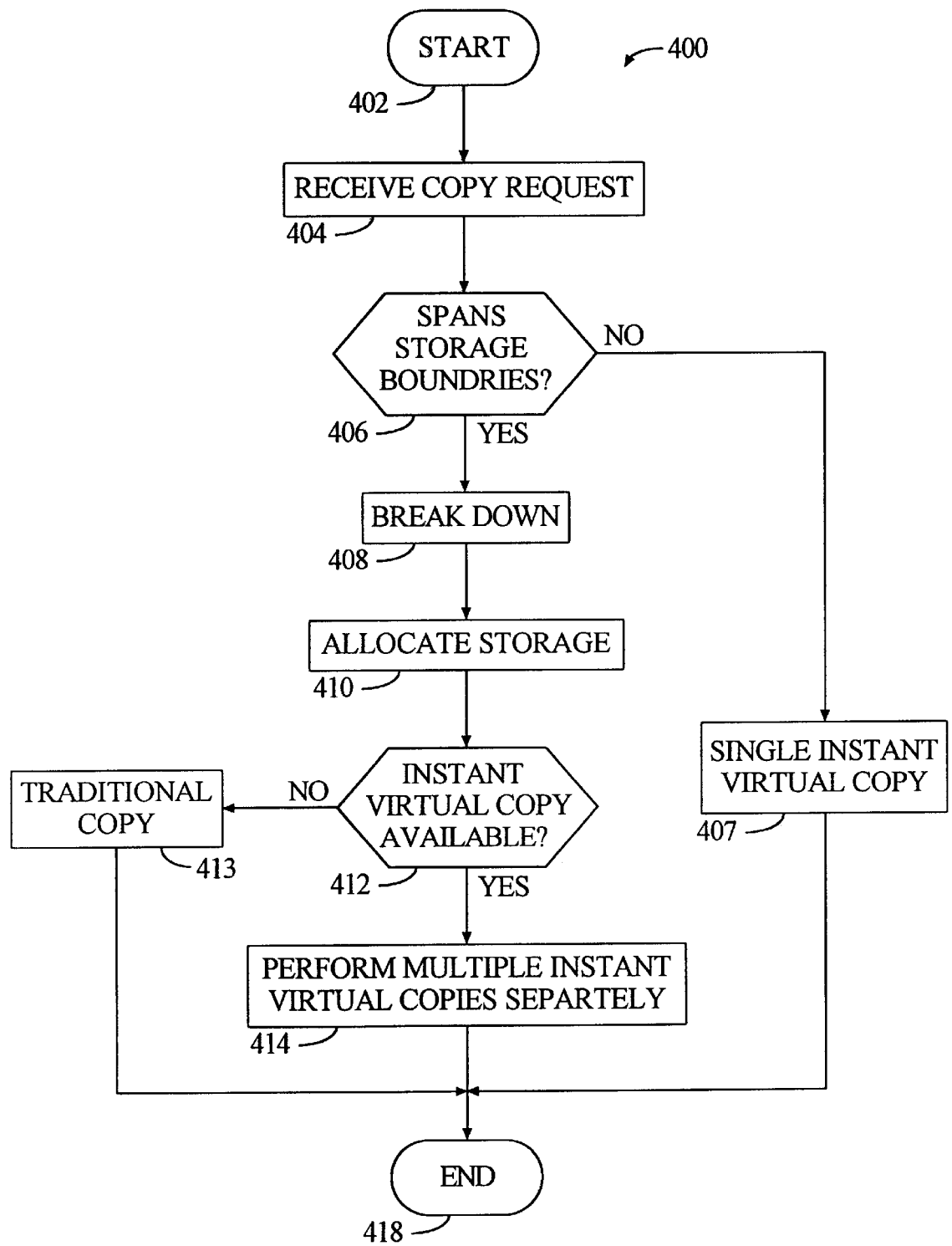
FIG. 4 is a flowchart of an instant virtual copy sequence applicable to data objects spanning storage boundaries.

FIG. 4 shows a sequence 400 for performing an instant virtual copy operation for any data object, including those that span storage boundaries, such as logical and/or physical DASD subsystems. For ease of explanation, but without any intended limitation, the example of FIG. 4 is described in the context of the hardware system 100 described above. The steps 400 begin in step 402. In step 404, the host 102 receives a copy request from the interface 103. The copy request may arise from a human operator, application program, hierarchically superior computer, or another source. The copy request includes a copy command along with identification of a "source" data object contained in the data storage facility 104.

In step 406, the host 102 determines whether the source data object spans any "storage boundaries." Storage boundaries comprise logical DASD subsystem boundaries, log structured array ("LSA") boundaries, physical DASD subsystem boundaries, or any other boundary that would prevent instant virtual copy operations (as implemented in the system 100) from completing. In the examples shown in TABLE 1, the DATA OBJECT-6 data object spans the storage boundary 120c, because it resides across the logical devices 124–125, which occupy different logical subsystems 120a–120b. Another example is DATA OBJECT-10, which spans the physical storage boundary 120d because this volume resides partially in the DASD subsystem 120 (in logical device 127 of the logical DASD subsystem 120b) and partially in the DASD subsystem 130 (in logical device 131).

As mentioned above, then, step 406 is performed by the host 102, which determines whether the source data crosses any of these storage boundaries. This may be achieved, for example, by the host 102 sending a query to the controller 116, which consults the maps 160, 170 to determine whether any storage boundaries are crossed. If step 406 finds that the source data object does not span any storage boundaries, the host 102 performs a single, instant virtual copy in step 407, and the copy routine 400 ends in step 418.

In contrast, if step 406 finds that the source data spans one or more storage boundaries, the host 102 advances to step 408. In step 408, the host 102 identifies subparts of the source data object that do not span any storage boundaries. This may be performed by querying the controller 116, or by utilizing results of the query previously sent to the controller 116 to determine whether any storage boundaries are crossed (step 406). In either case, this information is available from the maps 160, 170.

The subparts may be designated by naming appropriate storage locations or ranges, such as a logical device and one or more tracks or other logical addresses. For greatest efficiency, the host 102 identifies the minimum number of subparts possible. For example, in the case of a request to copy DATA OBJECT-10, the host 102 optimally separates this data object into a first subpart residing on the logical device 127, and a second subpart residing on the logical device 131. In the case of DATA OBJECT-6, it may be most efficient to designate three subparts, even though the data object only resides in two logical DASD subsystems, because the parts of the data object in logical devices 123–124 are not contiguous parts of the data object, even though logical devices 123–124 are in the same DASD subsystem 120a.

Next, in step 410 the host 102 separately allocates storage in the logical DASD subsystem 120b and in the physical DASD subsystem 130 for the copies of each designated data object subpart. Namely, continuing with the previous example using DATA OBJECT-10, the host 102 allocates storage in (1) the DASD subsystem 120b for the copy of the part of DATA OBJECT-10 stored in the device 127, and (2) the DASD subsystem 130 for the copy of the part of DATA OBJECT-10 stored in the device 131. As an example, this step may be performed by separately inputting the data object subparts (designated in step 408) to the allocation engine 108, whereupon the allocation engine 108 and requester 110 cooperatively allocate storage for each subpart. Although not previously known for use with data object subparts, the present invention contemplates the application of different known allocation techniques to determine the amount of space to allocate, where to allocate the storage space, etc. The host implements its storage allocation (step 410) by modifying the catalog 136, via the controller 116 as an intermediary.

In step 412, the host 102 determines whether the instant virtual copy process is available for the requested copy. Instant virtual copy may be unavailable for various reasons, such as insufficient storage space of the type and/or location for one or more subparts to be copied, etc. If instant virtual copy is unavailable, the host 102 performs the requested copy operation using traditional methods (step 413). Traditional copy methods involve the host 102 reading the source data object into local storage 112, then rewriting the data object to the storage facility 104 to form the requested copy in the storage facility 104. After the traditional copy is completed (step 413), the program 400 ends in step 418.

On the other hand, if instant virtual copy is available, step 412 advances to step 414. In step 414, the host 102 requests the controller 116 to carry out a modified instant virtual copy operation for the storage boundary spanning source data object. In response, the controller 116 separately performs one instant virtual copy operation for each designated subpart of the data object. The controller performs step 414 by modifying the maps 160, 170 in accordance with flash copy, snapshot, or another instant virtual copy technique. As another example, step 414 may employ the techniques disclosed in U.S. application Ser. No. 09/162,333, entitled "Method and Apparatus for Immediate Data Backup by Duplicating Pointers and Freezing Pointer/data Counterparts," filed on Sep. 28, 1998. The foregoing patent application is hereby incorporated by reference into the present application.

Also in step 414, the host 102 updates the catalog 136 to reflect creation of the new data object copy. Thus, despite the separate virtual copying of the data object's subparts, the subpart copies are still referenced as being a single copy of the entire source data object. This is done, at least in part, by configuring the catalog 136 to list the copied subparts as a single data object, i.e., the data object copy. After the virtual copy is complete, the controller 116 reports completion of the copy operation to the host 102, and host 102 then sends a similar report to the interface 103. Finally, the routine 400 ends in step 418.

OTHER EMBODIMENTS

While the foregoing disclosure shows a number of illustrative embodiments of the invention, it will be apparent to those skilled in the art that various changes and modifications can be made herein without departing from the scope of the invention as defined by the appended claims. Furthermore, although elements of the invention may be described or claimed in the singular, the plural is contemplated unless limitation to the singular is explicitly stated. Additionally, ordinarily skilled artisans will recognize that operational sequences must be set forth in some specific order for the purpose of explanation and claiming, but the present invention contemplates various changes beyond such specific order.

What is claimed is:

1. A method for conducting a virtual copy of a data object residing in a machine-readable digital storage, where the storage includes one or more storage boundaries spanned by the data object, the method comprising operations of:
   dividing the data object into multiple segments, where each segment does not cross any of the storage boundaries; and
   performing one or more separate instant virtual copy operations for each segment.

2. The method of claim 1, the storage boundaries including divisions between at least one of the following: logical storage subsystems, physical storage subsystems.

3. The method of claim 1, where the dividing operation comprises identifying separate regions of the storage constituting the segments.

4. A method for operating a data storage system including multiple storage regions, comprising operations of:
   receiving a request to copy a data object residing in the data storage system;
   determining whether the data object resides in more than one of the regions;
   if the data object resides in more than one of the regions, identifying subparts of the data object, each subpart residing within a single one of the regions, and performing one or more instant virtual copy operations for each subpart; and if the data object resides in a single one of the regions, performing one instant virtual copy operation for the entire data object.

5. The method of claim 4, where each region corresponds to one of the following: a logical storage subsystem, a physical storage subsystem.

6. The method of claim 4, the operation of identifying subparts comprising specifying memory locations where the subpart resides in the data storage system.

7. A signal-bearing medium tangibly embodying a program of machine-readable instructions executable by a digital processing apparatus to perform operations to conduct a virtual copy of a data object residing in a machine-readable digital storage, where the storage includes one or more storage boundaries spanned by the data object, the operations comprising:

dividing the data object into multiple segments, where each segment does not cross any of the storage boundaries; and initiating one or more separate instant virtual copy operations for each segment.

8. The medium of claim 7, the storage boundaries including divisions between at least one of the following: logical storage subsystems, physical storage subsystems.

9. The medium of claim 7, where the dividing operation comprises identifying separate regions of the storage constituting the segments.

10. A signal-bearing medium tangibly embodying a program of machine-readable instructions executable by a digital processing apparatus to perform a method to operate a data storage system including multiple storage regions by per, the method comprising operations of:

receiving a request to copy a data object residing in the data storage system;

determining whether the data object resides in more than one of the regions;

if the data object resides in more than one of the regions, identifying subparts of the data object each subpart residing within a single one of the regions, and initiating one or more instant virtual copy operations for each subpart; and if the data object resides in a single one of the regions, initiating one instant virtual copy operation for the entire data object.

11. The medium of claim 10, where each region corresponds to one of the following: a logical storage subsystem, a physical storage subsystem.

12. The medium of claim 10, the operation of identifying subparts comprising specifying memory locations where the subpart resides in the data storage system.

13. A logic circuit of multiple interconnected electrically conductive elements configured to perform operations to perform operations to conduct a virtual copy of a data object residing in a machine-readable digital storage, where the storage includes one or more storage boundaries spanned by the data object, the operations comprising:

dividing the data object into multiple segments, where each segment does not cross any of the storage boundaries; and initiating one or more separate instant virtual copy operations for each segment.

14. A logic circuit of multiple interconnected electrically conductive elements configured to perform operations to perform operations to operate a data storage system including multiple storage regions by per, the method comprising operations of:

receiving a request to copy a data object residing in the data storage system;

determining whether the data object resides in more than one of the regions;

if the data object resides in more than one of the regions, identifying subparts of the data object each subpart residing within a single one of the regions, and initiating one or more instant virtual copy operations for each subpart; and if the data object resides in a single one of the regions, initiating one instant virtual copy operation for the entire data object.

15. A data storage system, comprising:

a data storage facility including a controller and machine-readable digital storage including one or more storage boundaries; and a host, coupled to the data storage facility, configured to perform operations to conduct a virtual copy of a data object residing in the machine-readable digital storage, where the data object spans one or more of storage boundaries, the operations comprising:

dividing the data object into multiple segments, where each segment does not cross any of the storage boundaries; and directing the controller to perform one or more separate instant virtual copy operations for each segment.

16. The system of claim 15, the storage boundaries including divisions between at least one of the following: logical storage subsystems, physical storage subsystems.

17. The system of claim 15, where the dividing operation comprises identifying separate regions of the storage constituting the segments.

18. A data storage apparatus, comprising:

a data storage including one or more storage regions;

a controller coupled to the data storage; and a processor, coupled to the data storage, configured to perform operations to operate the data storage, the operations comprising:

receiving a request to copy a data object residing in the data storage;

determining whether the data object resides in more than one of the regions;

if the data object resides in more than one of the regions, identifying subparts of the data object each subpart residing within a single one of the regions, and directing the controller to perform one or more instant virtual copy operations for each subpart; and if the data object resides in a single one of the regions, directing the controller to perform one instant virtual copy operation for the entire data object.

19. The system of claim 18, where each region corresponds to one of the following: a logical storage subsystem, a physical storage subsystem.

20. The system of claim 18, the operation of identifying subparts comprising specifying memory locations where the subpart resides in the data storage facility.

* * * * *